April 14, 1970  A. KORPEL  3,506,928
RADIATION SCANNING APPARATUS
Filed Jan. 25, 1967
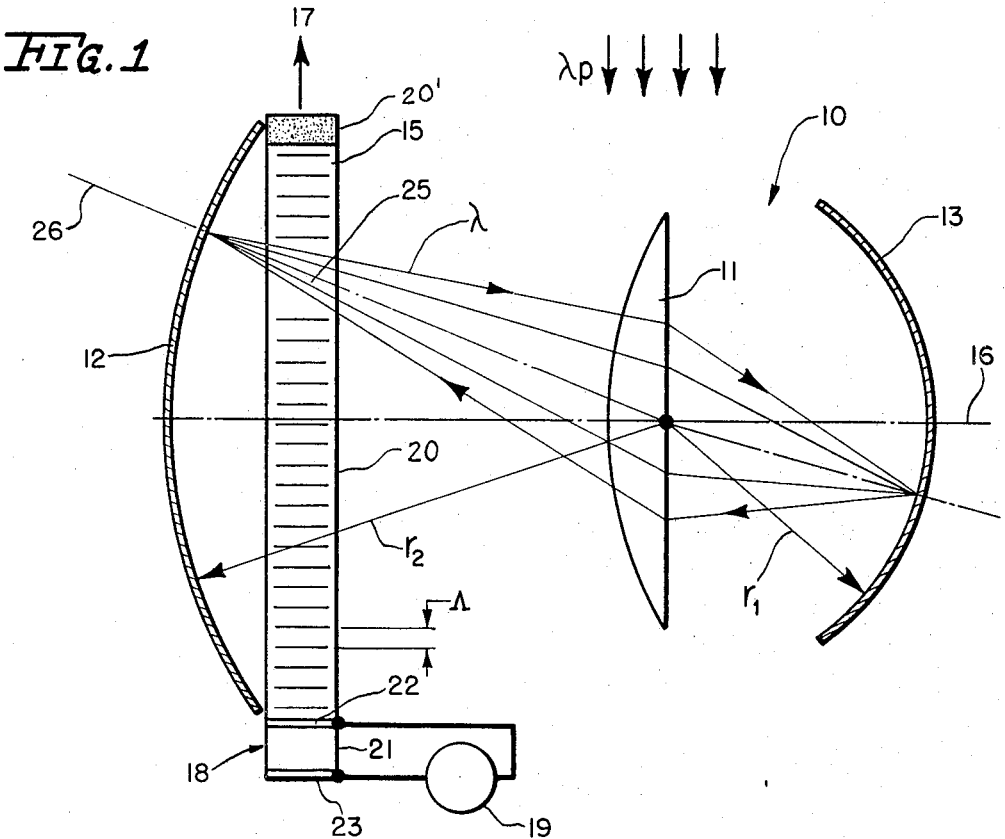
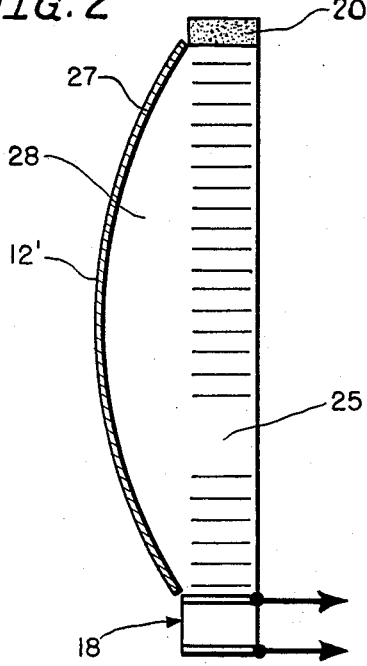
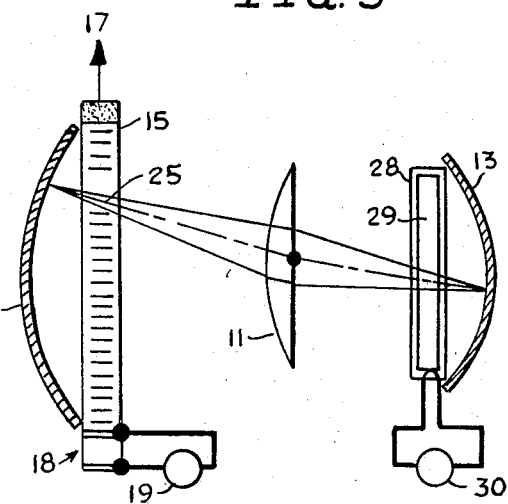
Inventor
Adrianus Korpel
By *Hugh L. Drake*
Attorney ary, Apr. 14, 1970

United States Patent Office 3,506,928
Patented Apr. 14, 1970

3,506,928
RADIATION SCANNING APPARATUS
Adrianus Korpel, Prospect Heights, Ill., assignor to Zenith Radio Corporation, Chicago, Ill., a corporation of Delaware
Filed Jan. 25, 1967, Ser. No. 611,703
Int. Cl. H01s 3/00
U.S. Cl. 331—94.5                      5 Claims

ABSTRACT OF THE DISCLOSURE

A conjugate laser includes an optical cavity in which an active laser element images onto one cavity reflector a plurality of points on an opposing cavity reflector. A series of spaced pulses of acoustic waves are propagated across one end of the cavity. The acoustic waves scatter the light from the laser element and prevent regenerative lasing except along a path through the gap between successive acoustic wave pulses; as that gap moves across the cavity the position of the light emerging therethrough correspondingly changes.

---

Particularly since the advent of the laser, considerable effort has been devoted to the development of apparatus capable of deflecting the intense coherent beam of light produced by the laser. In one approach, acoustic waves propagating across the light beam are so oriented relative thereto as to diffract at least a portion of the light beam at an angle to its original direction of travel. A change in the frequency of the sound waves results in a corresponding change in the angle of diffraction so that the system can be used to cause the beam to be scanned over a surface such as a screen upon which an image is formed in correspondence with variations in the intensity of the light beam. In one such arrangement, the diffraction of the light beam takes place externally to the laser itself, while in another arrangement the sound waves propagate along a path inside the usual optically resonant cavity of the laser. Other previous approaches have involved complex arrangements of polarizing elements within the laser cavity in an effort to selectively control the axis within the cavity along which regeneration occurs.

It is a general object of the present invention to provide a new and improved apparatus for scanning a radiation beam, apparatus which is essentially dependent only upon elements of comparative simplicity of design and construction.

Another object of the present invention is to provide a new and improved laser in which the beam of radiation emerging therefrom is selectively moved in position or scanned by an element included within the cavity of the laser itself.

A further object of the present invention is to provide apparatus of the foregoing character in which the scanning action is effected without the utilization of moving parts.

Radiation scanning apparatus constructed in accordance with the present invention includes means for creating a quantity of radiation directed along a plurality of given paths. Acoustic waves are caused to be propagated along a path transverse to those given paths with the acoustic waves acting to scatter the radiation. The apparatus further includes means for developing and launching a series of spaced pulses of the aforesaid acoustic waves.

The features of the present invention which are believed to be novel are set forth with particularity in the appended claims. The organization and manner of operation of the invention, together with further objects and advantages thereof, may best be understood by reference to the following description taken in connection with the accompanying drawing, in the two figures of which like reference numerals identify like elements, and in which:

FIGURE 1 is a schematic diagram of one embodiment incorporating the present invention;

FIGURE 2 is a schematic diagram of an alternative form of a portion of the apparatus shown in FIGURE 1; and FIGURE 3 is a schematic diagram of an embodiment of the present invention providing a two-dimensional scan.

FIGURE 1 illustrates a laser 10 including an active laser element 11, of a material capable of lasing such as ruby, disposed within a conjugate optically resonant cavity defined by a pair of cylindrical mirrors 12 and 13 having a common center and thus concentric. Element 11 in this case is in the form of an optical lens exhibiting an effective index of refraction such that, together with the distance selected between mirrors 12 and 13, different points or areas throughout the surface of mirror 12 are imaged on correspondent opposing points or areas on mirror 13 and vice versa. Laser action within element 11 is induced by the usual pumping radiation $\lambda_p$ which is permitted to enter the cavity between mirrors 12 and 13. The laser radiation is of wavelength $\lambda$ which may be within either the visible or invisible portions of the spectrum.

Various different conjugate laser resonators have been suggested to the art and the form shown in FIGURE 1 is merely illustrative and simplified. In one alternative form, for example, the active laser element is in the form of a cylindrical rod and the lens function and one of the mirror functions are performed by the carefully-ground end surfaces of the rod of active material. Other forms are exemplified in an article entitled "Wide Field Active Imaging," by R. A. Myers et al. in the IEEE Journal of Quantum Electronics, volume QE-2, No. 8, August 1966, pp. 270–275. The active laser element may be either a solid or a gas. In any case, the mode structure of a conjugate laser cavity is highly degenerate, being capable of developing numerous independent spatial modes in many different directions. Such a configuration may be used by itself, for example, as an image amplifier. That is, an image formed on one of the cavity mirrors is displayed on the other mirror.

In accordance with the present invention, however, advantage is taken of the characteristics of the conjugate laser system to enable the development of a selectably directable beam of the laser radiation. To this end, a medium 15 is disposed within the cavity across the axis of symmetry 16 of reflectors 12 and 13 and in this case adjacent to but spaced from mirror 12. Medium 15 is capable of propagating acoustic waves along a path extending in the direction indicated by arrow 17 and generally transverse to the many different possible radiation paths between areas on reflector 12 and correspondingly conjugate areas on reflector 13.

Coupled to medium 15 are means fo rdeveloping and launching in that medium a series of spaced pulses of acoustic waves. As illustrated, this element takes the form of a transducer 18 driven by a signal source 19. Medium 15 may be of any material which is both transparent to the laser radiation and at the same time is capable of propagating the acoustic waves launched by transducer 18 with a sufficient wave amplitude in the medium that the waves serve to scatter the radiation from active element 11.

In one representative form, medium 15 simply is water contained within a housing 20 of glass or other radiation-transparent material. The sound waves of wavelength A are propagated from transducer 18 to an acoustic absorbing material 20' at the other end of medium 15 which prevents reflection of the acoustic waves. In this case, transducer 18 is simply a slab of a piezoelectric material 21 such as quartz sandwiched between a pair of conductive electrodes 22 and 23.

In order selectively to control the portion of the optically resonant cavity in which lasing is permitted to occur, signal source 19 produces a discontinuous signal so that at times a gap 25 exists between successive series of acoustic waves in medium 15. Radiation reflecting conjugately back and forth between mirrors 12 and 13 and in alignment with gap 25 is undisturbed by the acoustic waves as a result of which regeneration occurs to the point of oscillation or lasing. Consequently, a radiation beam emerges through one or both mirrors in alignment with the conjugate axis 26 extending through gap 25. With the cylindrical cavity of FIGURE 1, the beam is in the shape of a thin band as viewed on the reflector from which it emerges. Of course, one of the mirrors may be 100 percent reflective while the other is very slightly less reflective as a result of which the beam emerges only through the latter of the two mirrors.

Preferably, the pulse length of each individual signal pulse developed by source 19 is slightly less than the time it takes the acoustic waves to travel the width of mirror 12. The gap in the acoustic waves is of a width just sufficient to pass the converging radiant energy directed from element 11 to mirror 12 and form a band on the latter of the desired thickness. In effect, gap 25 is thereby caused to traverse the width of mirror 12 as a result of which the active conjugate axis swings from one side of mirror 12 to the other and, correspondingly, the emerging beam likewise is scanned from one side of mirror 12 to the other. Similarly, the beam emerging from mirror 13 also is scanned from one side to the other. The width of gap 25, or the off time between successive series of the applied acoustic pulses, determines the thickness of the resulting laser beam. At all other regions along medium 15 except in gap 25, the acoustic waves sufficiently scatter the radiation to spoil the laser activity and hence prevent lasing except through the gap.

As an alternative to including a completely separate element within the laser cavity for conducting the acoustic waves across the cavity, FIGURE 2 illustrates a modification for that portion of the device of FIGURE 1. In this case, reflector 12 is replaced by a mirror 12' formed either on a curved surface 27 of a solid acoustically-propagative material 28 or defines one wall of a container for a liquid acoustically-propagative medium such as the water utilized as medium 15 in FIGURE 1. Consequently, the medium designated 28 in FIGURE 2 is structurally integral with and in juxtaposition to reflector 12. As before, transducer 18 serves to launch the acoustic waves within medium 28 so that they traverse the possible regenerative paths within the laser cavity after which the acoustic waves are effectually terminated in absorber 19.

As shown in FIGURES 1 and 2, reflectors 12 and 13 are cylindrical and gap 25 moves in one direction. This enables scansion of the emerging beam in that same direction, such as either horizontally or vertically. By forming mirrors 12 and 13 to be of narrow width, into the plane of the paper, the resulting beam approaches the shape of a spot instead of a band. Of course, a mask could be used with wider mirrors, but that would be wasteful of the laser power available. It is thus possible, in any case, to use such a cylindrical cavity system to cause scanning in a first direction and then to mechanically rock the entire assembly in the orthogonal direction in order to permit the scanning of a complete image raster as in a television-type system; in that case, the mechanical scanning usually would be employed for the much lower vertical scan function while the acousto-optical scanning system illustrated would be employed for the horizontal scan function.

On the other hand, both horizontal and vertical scanning may be achieved in the cavity itself by propagating a second series of spaced acoustic waves in a direction at a right angle to path 17. Most conveniently, as shown in FIGURE 3, the second acoustic wave propagating medium is 28 coupled to a transducer 29 driven by a signal source 30 is included in the vicinity of reflector 13 at the opposite end of the cavity but otherwise it may be identical to the system already described with respect to medium 15 except for the possibly different repetition rate of the acoustic wave pulses corresponding to the difference between horizontal and vertical scanning rates. In any case, the second series of acoustic waves also crosses the possible radiation regeneration paths and regeneration is permitted only along an axis extending both though gap 25 in the one series of acoustic waves and in the corresponding gap in the other series of acoustic waves. Hence, the light emerges as a spot rather than as a band of radiation, the spot being aligned with the spaced areas of effective intersection of the respective acoustical gaps. Particularly in this case of bi-directional scanning, it is preferred that mirrors 12 and 13 be spherical instead of merely cylindrical.

The disclosed apparatus permits selective control of the direction of emission of a beam of radiation from a laser cavity. The essential control element is in itself completely passive inasmuch as it constitutes an absence of acoustic waves in a regenerative path within a laser. Consequently, the entire system is comparatively simple in both principle and practice, and scanning of the intense beam is effected without the utilization of moving parts. There need be no fly-back time interval. Because the scanning mechanism is included within the laser cavity itself, the overall system is compact.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:
1. Radiation scanning apparatus comprising:
   means for creating radiation of a predetermined frequency directed along a plurality of different paths, including a conjugate optical cavity resonant at said predetermined frequency and defined by a pair of coaxially opposed concentric spherical mirrors;
   a medium disposed within said cavity across the common optical axis of said mirrors for propagating acoustic waves along a first path transverse to said given paths with said acoustic waves acting to scatter said radiation;
   and means for developing and launching in said medium a series of spaced pulses of said acoustic waves.
2. A radiation scanning apparatus as defined in claim 1 which further includes:
   an element for propagating acoustical waves along a second path at an angle to said first path and transverse to said given paths with said acoustical waves also acting to scatter said radiation;
   and a source for developing and launching in said element a series of spaced pulses of said acoustical waves.
3. Radiation scanning apparatus comprising:
   means for creating radiation of a predetermined frequency directed along a plurality of different paths, including a conjugate optical cavity resonant at said predetermined frequency and defined by a pair of coaxially opposed mirrors with means including a lens disposed within said cavity for imaging areas on one of said mirrors onto corresponding areas on the other of said mirrors;

a medium disposed within said cavity across the common optical axis of said mirrors for propagating acoustic waves along a first path transverse to said given paths with said acoustic waves acting to scatter said radiation;

and means for developing and launching in said medium a series of spaced pulses of said acoustic waves.

4. Apparatus as defined in claim 3 in which said lens is formed of an active laser material and said apparatus further includes means for pumping said material to induce lasing thereof and develop said radiation.

5. Radiation scanning apparatus comprising:

means for creating radiation of a predetermined frequency directed along a plurality of different paths including a conjugate optical cavity resonant at said predetermined frequency, defined by a pair of coaxially opposed mirrors, and including an active laser material disposed within said cavity;

means for pumping said material to induce lasing thereof and develop said radiation;

a medium disposed within said cavity along the common optical axis of said mirrors for propagating acoustic waves along a first path transverse to said given paths with said acoustic waves acting to scatter said radiation;

and means for developing and launching in said medium a series of spaced pulses of said acoustic waves, with the duration of said pulses being approximately equal to the propagation time for said waves to traverse all of said given paths and said acoustic waves confining regeneration of said radiation to a region aligned with a space between successive ones of said pulses.

References Cited

UNITED STATES PATENTS 3,297,876   1/1967   De Maria _____ 250—199

RONALD L. WIBERT, Primary Examiner

P. K. GOODWIN, Jr., Assistant Examiner

U.S. Cl. X.R.

350—161